C. OWENS, U. G. LEE & A. LYLE.
MAILING MACHINERY.
APPLICATION FILED SEPT. 28, 1910.
1,012,424.
Patented Dec. 19, 1911.
5 SHEETS—SHEET 5.
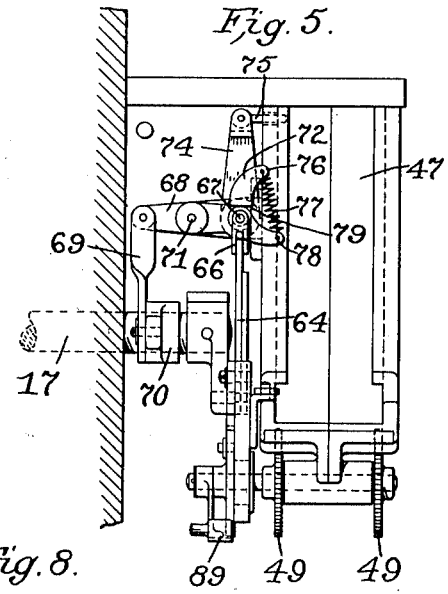
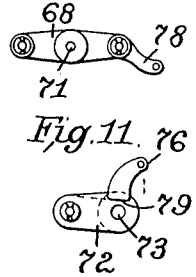
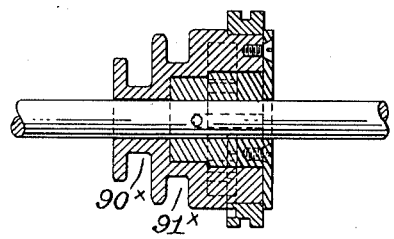
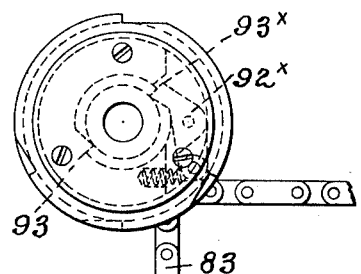
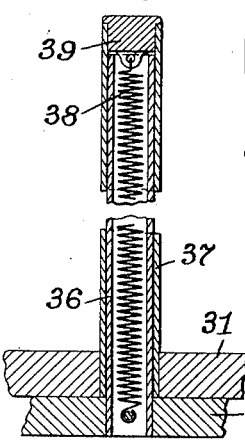
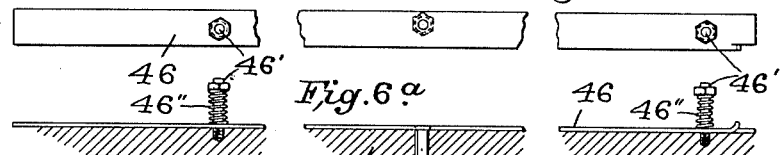
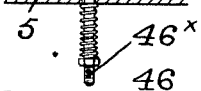
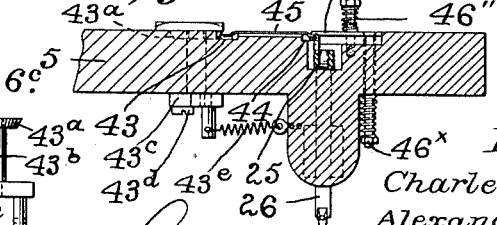
Inventors:
Charles Owens,
Alexander Lyle, &
Ulysses G. Lee,

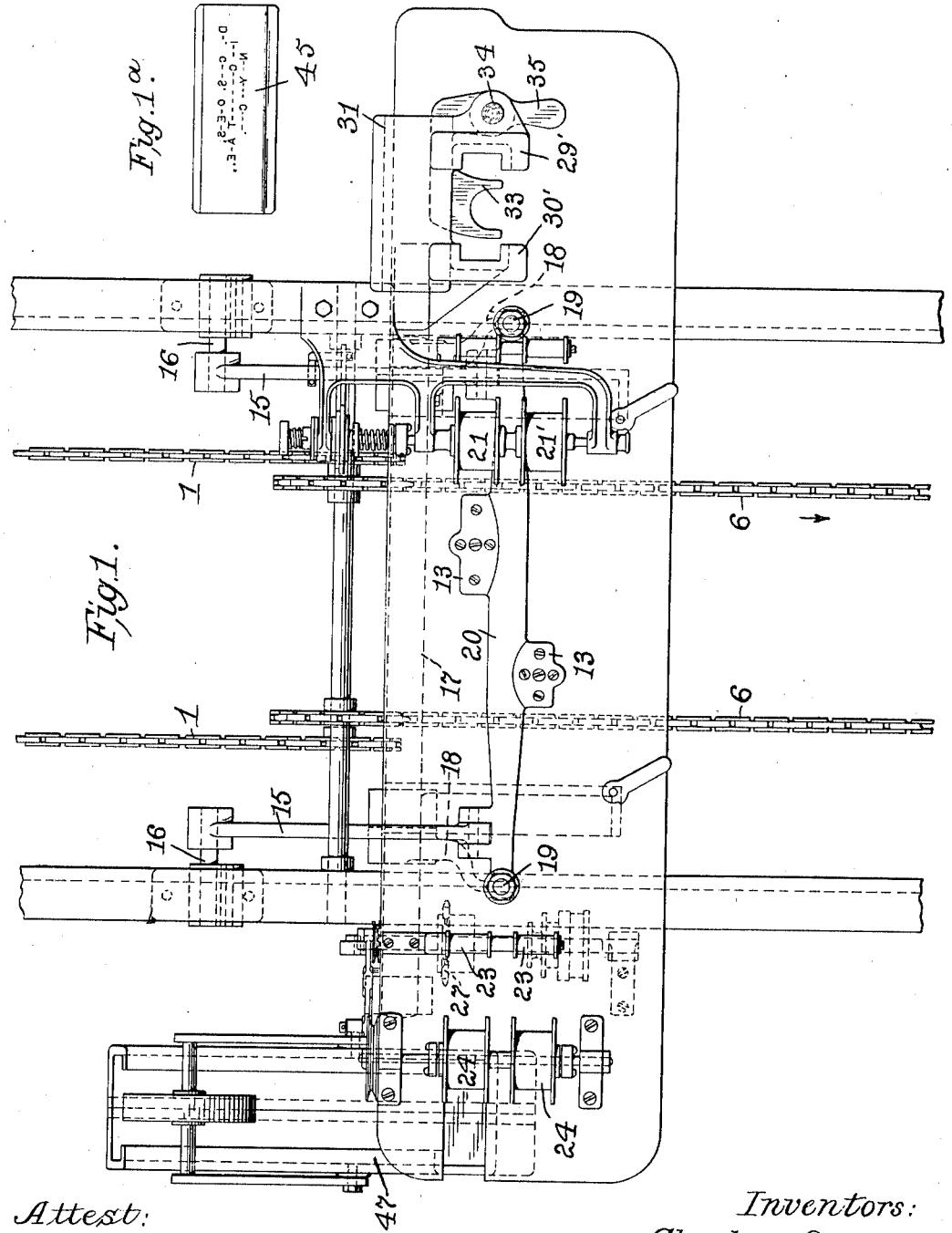

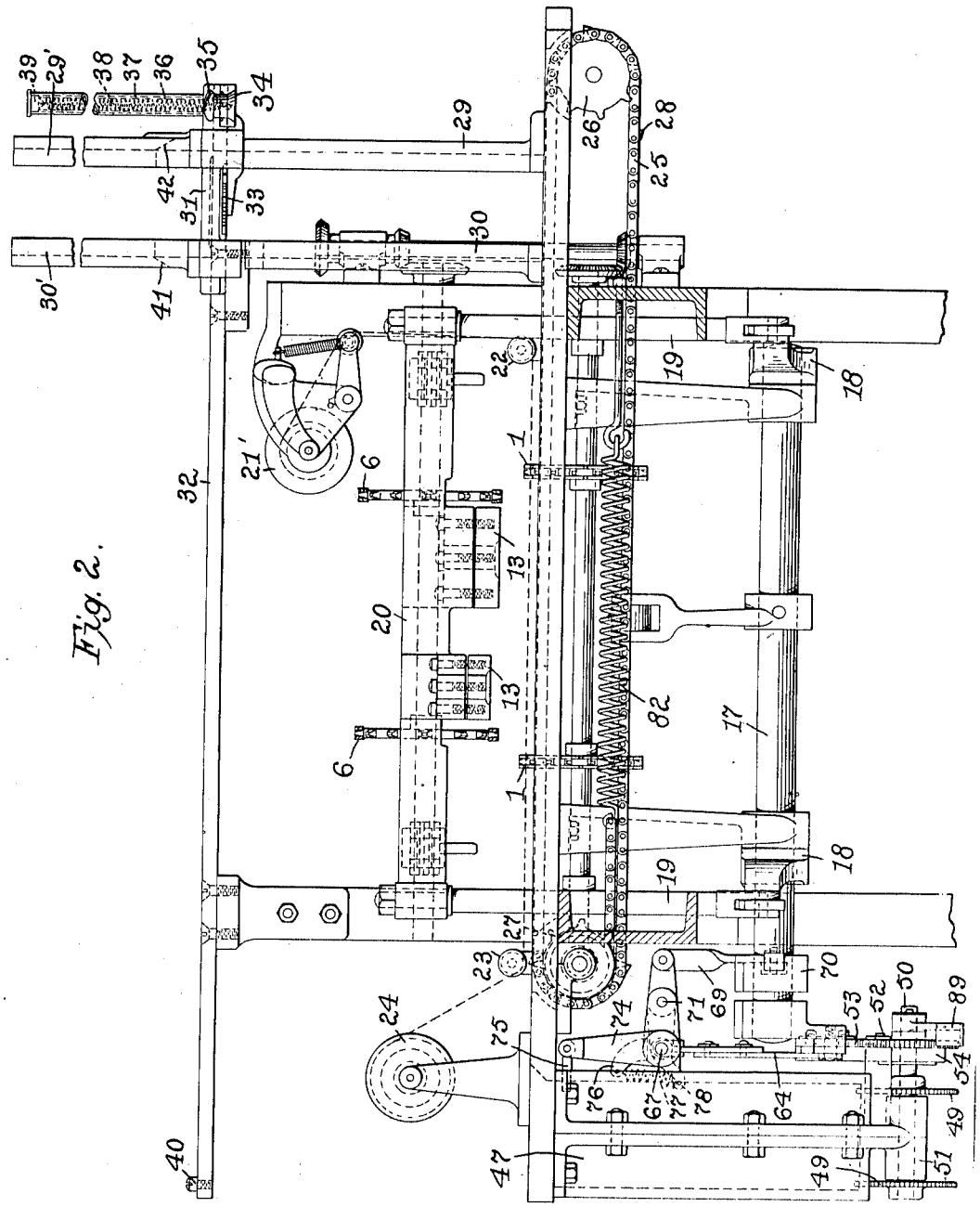

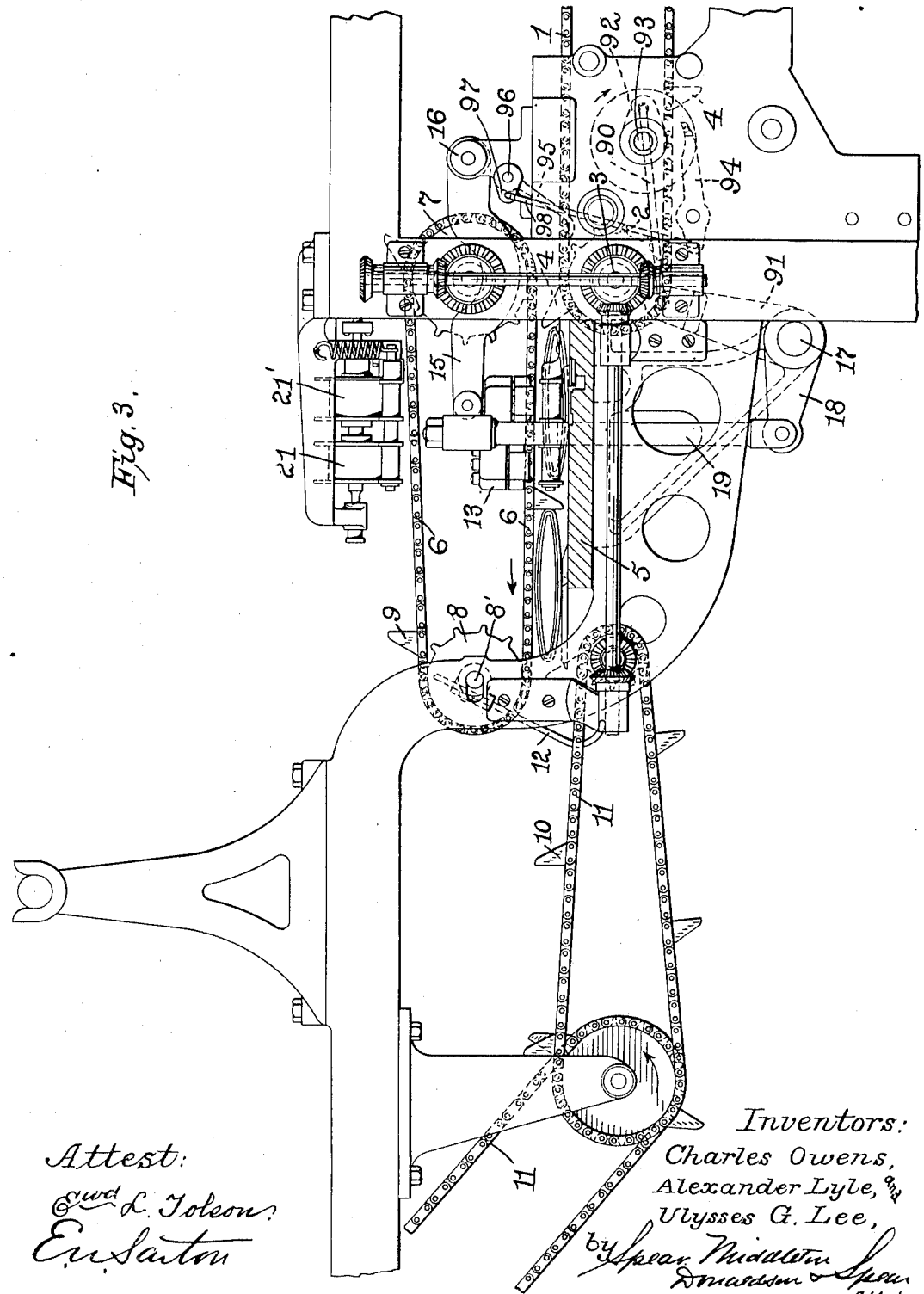

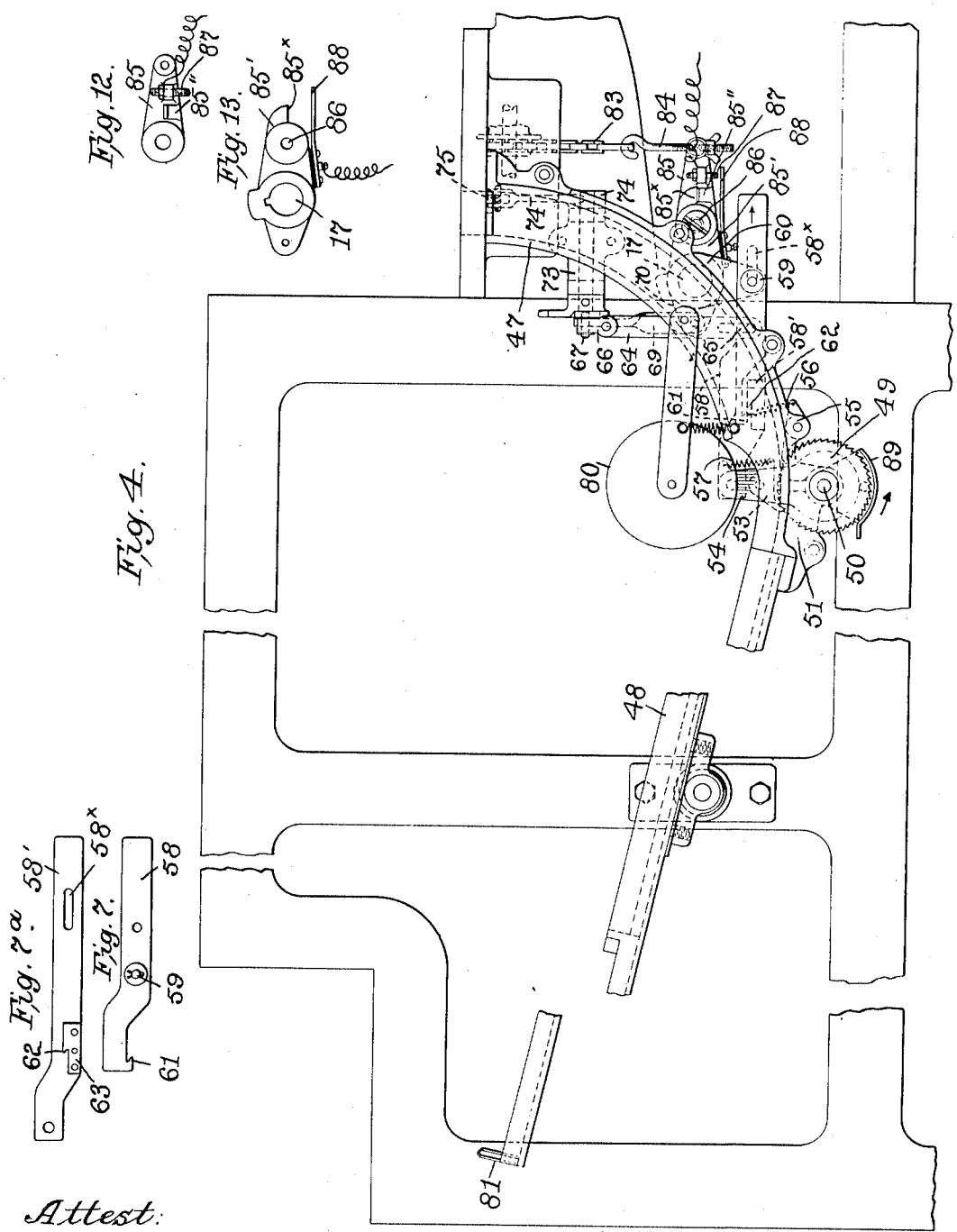

UNITED STATES PATENT OFFICE.

CHARLES OWENS, ULYSSES G. LEE, AND ALEXANDER LYLE, OF NEW YORK, N. Y., ASSIGNORS TO MONTAGUE MAILING MACHINERY COMPANY, OF NEW YORK, N. Y., A CORPORATION OF TENNESSEE.

MAILING MACHINERY.

1,012,424.  Specification of Letters Patent.  Patented Dec. 19, 1911.

Application filed September 28, 1910. Serial No. 584,271.

*To all whom it may concern:*

Be it known that we, CHARLES OWENS, ULYSSES G. LEE, and ALEXANDER LYLE, citizens of the United States, residing at New York city, New York, have invented certain new and useful Improvements in Mailing Machinery, of which the following is a specification.

Our invention relates to mailing apparatus and systems in which the articles to be mailed are addressed by the use of address plates which are fed to the printing point, and from which the impressions are made upon the magazines or other articles to be mailed, and the invention includes the novel means for feeding the magazines and means for feeding the address plates, and for receiving the address plates after the impressions have been made.

The invention consists in the features of construction and combination and arrangement of parts hereinafter described and particularly pointed out in the appended claims.

In the accompanying drawings Figure 1 is a plan view of the portion of the apparatus embodying our invention; Fig. 1ª is a plan view of an address plate; Fig. 2 is a cross sectional view of a portion of the apparatus with parts in front elevation; Fig. 3 is a side view of a portion of a machine embodying our invention looking from the right of Fig. 1, parts, however, being in section; Fig. 4 is an elevation looking from the left of Fig. 1; Fig. 5 is a detail view of the detector and controlling mechanism for the stacker feed; Fig. 5ª is a view of the tubes for pivotally mounting the follower of the plate chute; Fig. 6 is a detail view of the guideway for the address plates and a spring retainer plate; Figs. 6ª and 6ᵇ are views of the retainer plate; Fig. 6ᶜ is a detail view of a stop roller; Fig. 7 is a detail view of one of the members of a two-part link; Fig. 7ª is a view of a companion link to that shown in Fig. 7; Fig. 8 is a sectional view and Fig. 9 a side view of a clutch for the address plate feeder; Figs. 10 and 11 are views of details relating to the detector mechanism; Figs. 12 and 13 are views of members of a compound lever for operating the address plate feeder.

In these drawings, 1 indicates a feed chain or chains for the magazines or other articles to be addressed, said chains passing around sprocket wheels 2 on a shaft 3 suitably mounted in the frame. This chain carries projections 4 to engage the magazines and move them forward over a table 5, where they are allowed to rest a sufficient length of time to receive the impressions from the printing plates, after which the magazines are carried forward by a second pair of chains 6 passing over sprocket wheels 7 and 8 on shafts mounted in the frame, the said chains 6 carrying projections 9 to engage the magazines. These projections 9 on the second pair of feed chains are so disposed in relation to the projections on the first pair of feed chains and the relative movements of these chains are such that after the magazine has been deposited on the table 5 to receive the impression, it will not be moved onward by the projections 9 until sufficient time has elapsed for making the impression. In other words, the projections 9 alternate in their action upon the magazines with the projections 4, so that the magazines will be allowed to rest on the table for making the impressions. The chains 6 move the magazines forward to a position to be taken by projections 10 on another pair of chains 11 passing about wheels mounted on shafts supported in the frame, which chains deliver the magazines to other suitable carrier chains 11, which discharge the magazines at any desired points. As the magazines leave the chains 6, they engage reversing hooks 12 which are mounted on the shaft 8′ of the sprocket or chain wheel 8, and by this hook or hooks the magazines are inverted so that the printing which is embossed on the under side of the magazine is turned to face upwardly to be exposed to view. This hook or hooks are held in the position shown by gravity, and when the magazine strikes the hook the said hook swings upwardly, and in this movement carries the front edge of the magazine up with it, and then the lower and rear edge being moved onwardly by the chains 11, reversing of the magazine takes place. The impression is made by an impression block or pad shown generally at 13 located at the end of the endless feeder 1, supported by arms 15 which are pivotally mounted on the frame at 16, and the up and down movement of the impression block or pad is derived from a rock shaft 17 suitably mounted in the frame, and having arms 18 connected with rods or pitmen 19, which are connected with the cross bar 20 carrying the impression pad or pads or blocks 13. The impression member or members operate upon the upper side of the magazine and force it downwardly so that the impression is made on the under side of the magazine from the address plates, which are embossed with the letters forming the address, and to which ink is supplied by a ribbon which is interposed between the address plate and the magazine, a suitable guard having an opening protecting the magazine from the ink ribbon, and the impression being made through the opening in said guard plate.

As shown, we may use a plurality of impression blocks as 13, 13, and we have indicated at 21 and 21' the ribbon spools for the ribbons, and also in Fig. 2 at 22, 23, the guide rollers for said ribbons, and a receiving spool or spools at 24. As these parts, specifically, form no portion of our improvement, we do not illustrate them more in detail herein.

The printing plates Fig. 1ª and shown at 45, Fig. 6, are carried into position beneath the impression blocks by a chain carrier 25 passing over sprocket wheels or drums 26 and 27, the said carrier chain moving transversely of the direction of movement of the magazines, or, in other words, transversely of the machine, the said chain or carrier having projections 28 thereon to engage the address plates and move them into and out of printing position. This chain is given a step by step movement through any suitable form of driving mechanism, and we preferably employ for this purpose a connection extending from the rock shaft 17, as will be hereinafter referred to. The printing plates are preferably of the form shown in Fig. 1ª, having the embossings or letterings as indicated. They are held one upon another in a pile in a magazine consisting of the uprights 29 and 30 at the right of the machine, Fig. 2, these uprights being channeled on their inner sides, as shown in Fig. 1, to provide a chute down which the address plates may fall, as they are taken one by one by the carrier chain 25 and moved across the machine.

In order that the magazine or chute 29, 30, may be supplied with fresh plates by an operator standing at the left of the machine or on that side opposite to that upon which the chute or magazine is located, we provide a supplemental chute or magazine consisting of the uprights 29' and 30' mounted upon a block or carrier 31 adapted to slide upon a bar or track 32 at or near the top of the machine and extending transversely across the same, so that the carrier 31, with its supplemental chute members 29' and 30', may be drawn to the left in Fig. 2 and here filled with address plates or receive a tray carrying said address plates, and said tray may be of the form illustrated in the applications of U. G. Lee, filed August 16, 1909, #513,044, and Owens and Lee, filed July 18, 1910, #572,610. This supplemental magazine or chute is also provided with ways on its interior to guide the address plates downwardly. The carrier or slide 31 has a follower plate 33 pivoted thereto at 34, and a handle at 35. The pivot 34 comprises an inner tube 36 to which the follower plate is fixed, together with its handle, and this tube or sleeve is adapted to move longitudinally and also to rotate in an outer tube 37 supported on the slide or carriage 31. A spring 38 connects the lower part of the inner tube with a cap 39 of the outer tube, and by this arrangement the follower plate may be lowered by pressing down on the handle 35 when the supplemental chute is moved to a position vertically in alinement with the main chute 29, 30, the spring within the tubes yielding for this purpose and allowing the inner tube to slide within the outer tube, and when the follower plate has been lowered to the top of the pile of plates in the main chute 29 and 30, the handle 35 is turned to swing the follower plate 33 out from under the pile of plates above it, so that these plates will then rest upon the plates in the main chute 29, 30. This operation for keeping the main chute supplied with plates will be performed by the operator should the supply of plates in the main chute have become partly exhausted, and there may be more or less plates remaining in the main chute when a new supply is added thereto, and this new supply may extend or reach up to a greater or less height in the supplemental chute portion. As soon, however, as the pile of plates moves down below the level of the supplemental chute portions and its carrier, the said carrier, with the supplemental chute portion, may be drawn by the operator to the left of the machine again for receiving a new supply of addressing plates. A suitable stop 40 is used at the left of the track 32, and a suitable stop may be used at the right to bring the supplemental chute portion in register with the main chute portion. As above stated, the supplemental chute may receive the address plates placed therein by hand, or a tray filled with address plates, such as illustrated in the above applications, may be placed in the supplemental chute by the operator, and in order to control the catches of this tray we have indicated inclines at 41 and 42 on the uprights 29' and 30'. The object of having the chute in two portions, one of which is shiftable in relation to the other from one portion of the machine to another, is to provide a chute into which the plates can be readily fed from a tray or filing drawer, and also to provide a residual portion to hold a sufficient number of reserve plates to enable the operator to change trays or filing drawers, that is, remove one tray or filing drawer from the supplemental or residual magazine and supply another while the machine is in operation, and as stated above, the machine as shown is intended to be used from one side only, that is, with the operator standing at the left of Figs. 1 and 2; but in cases where the mechanism is to be used from both sides of the machine, the bar or track 32 may be dispensed with, and the supplemental chute in that case may be fastened directly to the main chute portions.

Briefly stated, the operation of the supplemental chute is as follows: It is drawn across the machine to the left of Fig. 2 by the operator until the carrier 31 strikes the stop screw 40. The tray containing the address plates is then put in position by dropping it down in the channels of the uprights 29' and 30', the spring catches on the tray being thrown back by the inclines 41 and 42 on the chute, so that the pile of address plates will rest upon the movable follower plate 33. The operator then pushes the carrier 31 across to the right of Fig. 2 until it is arrested by the stop here, when the supplemental chute registers with the main chute, and then the operator, by pressing upon the handle 35, moves the follower 33 downwardly against the tension of the spring 38 until the follower plate is arrested by the pile of plates in the main portion of the magazine. The follower plate is then swung out of the way by operating the handle 35, and the follower plate will then be free to return to its upward position through the action of the spring 38, leaving the pile of plates which were in the supplemental chute portion resting upon those already in the main portion, and the tray is allowed to remain in the supplemental chute portion until it becomes empty. In order that the feeding of the plates to the machine may be continuous, the stationary or main portion of the chute is made of considerable length, thus giving considerable time for placing a new tray of plates in the machine. As in the application 513,044 above referred to, the plates are fed one by one from the bottom to the main chute along a guideway consisting of the grooves 43 and 44 to receive the rolled or thickened depressed margins of the address plates, one of which is indicated at 45 in Fig. 6. The groove 44 is bounded on its upper side by a retainer plate 46 which reaches over the said groove and receives beneath it the thickened rolled edge of the address plate, and at this point the address plate is engaged by the projections on the chain which bear upon the end of the address plate and move it longitudinally. This retainer plate is spring mounted, so that should a bent address plate be fed along the guide or runway, it will not become wedged, but the retainer plate will yield upwardly and allow the bent plate to pass. For this purpose we employ two studs 46' at separated points along the retainer plate extending up from the table or bed 5. These studs support springs 46'' which press the retainer plate downwardly, and there is also a rod 46$^x$ connected rigidly with the retainer plate and extending down through the bed 5 having upon its lower end a spring pressing upon a head or nut on the rod, which forces the retainer plate downwardly. By these means the retainer plate is held in position, but is allowed to yield upwardly should a bent plate come along. At each step by step movement of the chain one of the plates is brought to the printing point beneath the impression block or blocks. After the impression has been made, the plates are moved onward across the machine, and are delivered into a stacker chute 47, which is of curved form and connects with a straight extension 48 supported on the frame, this extension being inclined upwardly. The movement of the pile of plates in the stacker chute is governed by a pair of toothed wheels 49 fixed rigidly on a shaft 50 supported in a bracket 51, the said shaft carrying rigidly a ratchet wheel 52 to be operated by a pawl 53 pivotally mounted on a rocker arm 54 loosely mounted on the hub of the ratchet wheel. The ratchet wheel is also engaged by a detent 55 pivoted to the chute and pressed by a spring 56. This detent holds the ratchet against backward movement. The pawl is pressed by a spring 57. The rocker arm is given an oscillating movement by a link made up of two parts 58, 58', Fig. 7, the former of which is connected pivotally at 59 to an arm 60 carried by the rock shaft 17, by which, for every impression movement or feeding movement of the chain 25 which feeds the plates, the arm 60 and the link member 58 will be given one movement. This movement, however, is not always imparted to the rocker arm 54, but is controlled in accordance with the number of plates which have been deposited in the stacker chute. For purposes of this control, the link member 58 is provided with a hooked end 61 to engage a corresponding hook 62 on a block 63 fixed to the link member 58', which link member is connected with the rocker arm 54. This link member has a slot receiving the pin 59 which connects the oscillating arm 60 with the link member 58.

When the hooks 61 and 62 are in engagement, movement of the arm 60 toward the right will, through the link member 58, move the link member 58' also toward the right, and when the oscillating arm 60 moves toward the left, the pin 59, bearing against the left hand wall of the slot 58ˣ, will move the link member 58' leftward, and through the arm 54 the pawl 53 will be operated to turn the two toothed feed wheels 49. Should, however, the link member 58 be raised out of engagement with the link member 58', then the movement of the oscillating arm 60 toward the right will not retract the link member 58', but, on the contrary, the pin 59 will move freely in the slot 58ˣ of the link 58', and there will be no movement of the rocker arm 54, and, consequently, no stacker movement of the address plates will take place. The link 58 is raised and lowered to be disengaged from and engaged with its companion link member 58' by a link 64 having a pin and slot connection therewith at 65, the upper end of the link being pivoted to a link member 66, which, in turn, is pivoted at 67 to a lever 68. This lever is connected by a link 69 and arm 70 to the main rock shaft 17, so that as this rock shaft moves at each impression and plate feeding action, the lever 68 will also be moved. This lever is pivotally connected at 71 with a detector lever 72 which is fixed to a shaft 73 journaled in a suitable bearing in the frame, and having fixed thereto an arm 74, the upper end of which carries pivotally a detector consisting of a pin 75 guided through an opening near the upper end of the stacker chute 47, where said chute receives the plates as they leave the impression mechanism and the bed of the machine. The detector lever 72 has also an arm 76 connected by a spring 77 with an extension 78 on the controller lever 68, and by this spring the two levers are held in relation shown in Fig. 5, with a portion of the controller lever 68 bearing upon a shoulder at 79 formed by the base of the arm 76. The pivot point 67 between the link 66 and lever 68 is normally held axially in line with the center of the shaft 73, which carries the detector arm 74 and the detector lever.

So long as the pile of plates in the stacker chute does not reach up as high as the detector pin 75, this pin will reciprocate freely in its guide, the movement being derived from the rock shaft 17 through the arm 70, link 69, controller lever 68, the detector lever and detector arm 74, the lever 68 moving during this action as one body with the detector lever and detector arm owing to the tension of the spring 77 holding the lever 68 against the shoulder 79. Under the conditions just described, link 64 will be lifted at each movement of the rock shaft 17, and consequently at each impression and feeding action of the address plate, and this lifting action will raise the link 58 to prevent engagement thereof with the companion link 58', so that no feeding action of the feed wheels 49 upon the plates in the stacker chute will take place, so long as the plates have not been stacked as high as the plane of the detector pin. Supposing, however, that the plates have been stacked in the chute 47 up to the level of the detector pin 75 so as to be engaged therewith as it moves inwardly, the detector arm 74 will be arrested as well as the detector lever to which the controlling lever 68 is pivoted, and these parts remaining fixed, the movement of the rock shaft 17 and link 69 will cause the controller lever 68 to turn on the pivot 71, the spring 77 yielding for this purpose, and this will throw down the link 64 which will allow the link 58 to drop down so that its hook will engage that of the companion link 58', and, as the oscillating arm 60 moves toward the right, the companion link 58' will be retracted, retracting the pawl 53, and upon the swinging of the oscillating arm 60 toward the left, Fig. 4, the companion link 58' will be moved leftward by the pin 59 engaging the end wall of the slot 58ˣ, and thus a feeding movement of the wheels 49 will take place, and the stack of plates in the stacker chute will be lowered.

It will thus be seen that the feeding of the plates from the curved portion of the stacker chute to the inclined portion 48 will depend upon the height of the pile of plates stacked in the curved portion. It would be impossible to gage the movement of the pile of plates in the stacker chute with sufficient accuracy were they fed continuously, because the pile of plates in the stacker chute, if fed by a continuously operating mechanism, would either become too low or the stacker chute would become too full, and in order to avoid this difficulty and to keep the plates continually at a uniform height in the stacker chute, the automatic controlling mechanism for the feed is provided, as above described, so that the pile of plates may be always kept at the proper level. A large rubber roller 80 is provided for holding the plates firmly down on the toothed feed wheel 49. As the plates are fed up the inclined chute 48, the operator makes a division in this series of plates, and draws the pile of plates into the tray. This tray is supported at the outer end of the inclined chute portion 48, and is held by a spring 81. A colored division plate is interposed in the series of plates which indicates the dividing point for the tray.

As above described, the plates are fed forward by the feed chain, and for operating this feed chain we employ a clutch at the feed wheel 27 of substantially the same form as that shown in the application of U. G. Lee, filed August 16, 1909, #513,044, above referred to, and we also employ a spring 82 connected with the feed chain at one end, and with the main frame at its other end. The clutch is operated by a chain 83, Fig. 4, which wraps around the pulley portion of the clutch, and at its other end is attached to the hook 84 carried by a lever 85. This lever forms a part of a compound lever of which the other part 85' is fixed to the rock shaft 17. The portion 85 is pivoted at 86 to the companion portion 85', and this latter portion has a projection 85$^x$ to bear on a projection 85" on the member 85. Should the plates, for any cause, fail to feed through the guideway, the tension upon the chain 83 will be released, and as the rock shaft 17 continues to rock and to move the lever member 85' in an upward direction, the lever portion 85 pivots at 86. This portion of the compond lever remains in a stationary position until contact screw 87 comes in contact with the insulated spring 88. This contact between the lever 85 and spring 88 operates to stop the machine by means of an electric circuit until the trouble has been remedied. We provide a member 89 hung on the shaft 50 which ordinarily hangs downward, but when it is desired to disengage the pawls 53 and 55 from the ratchet wheel, the said member is rotated in the direction of the arrow to come beneath and form a shield for these pawls and hold them out of engagement with the ratchet wheel. The rock shaft 17 is operated through a connecting rod 90 which is connected with the arm 91 on said rock shaft, and is also connected with a disk 92 which is driven in any suitable manner, but preferably through a clutch connection with the shaft 93. This clutch is controlled through a lever 94 which, in turn, is controlled from a controller 95 consisting of an arm in the path of the incoming magazine, which arm is mounted on a shaft 96 and has an arm 97 connected by a link 98 with the clutch lever. Normally, the clutch is out of operation, but when a magazine comes along it strikes the controller, and thus operates the clutch lever to throw the clutch into operation, and then the operative parts of the machine above described perform their functions. A clutch, clutch lever, and a controller to be controlled by the magazine is shown in United States patent of Owens & Lyle, 889328, June 2, 1908.

We show in Figs. 8 and 9 details of the clutch mechanism through which movement of the rock shaft 17 is transmitted through the arm 85, 85', the hook 84 and chain 83, to said clutch. This clutch is on the shaft of the sprocket or chain wheel 27, and it has a pulley portion 90$^x$ about which the chain 83 passes, and a pulley portion 91$^x$ about which the chain leading from the spring 82 passes, but in opposite direction from that of the chain 83. This clutch member is loose on the shaft, and carries a pawl 92$^x$ pivotally to engage teeth 93$^x$ on a block fixed to the shaft. As the compound arm 85, 85' moves downwardly, it draws upon the chain 83 and turns the clutch member to carry the pawl backwardly to engage a fresh tooth, and then as the arm 85, 85' moves upwardly, the spring 82 turns the clutch member, and its pawl turns the shaft of the chain wheel 27, and gives the said chain a one-step movement.

Reverting to the operation of the arms 85 and 85', the downward movement of the arm 85', Fig. 4, will carry with it the arm 85 and hook 84 to turn the clutch back for a new movement by the spring 82, but if the plate has become jammed the spring 82 will not be strong enough to move the feed chain and consequently the clutch chain 83 will not be drawn upwardly and therefore the arm 85 will remain down while 85' will continue to rise, closing the contact and stopping the machine.

In Fig. 6$^c$ we show a stop near the printing point to insure the positioning of the address plate exactly at the desired point to make the impression. This consists of a roller 43$^a$ on a stud 43$^b$ carried by an arm 43$^c$ pivoted to the bed 5 at 43$^d$ and pressed by a spring 43$^e$, Fig. 6, the position of the roller under the action of this spring being such that its beveled edge projects slightly into the guide groove 43, so that as the plate comes along it will contact with this roller and be positioned at the desired point, the beveled edge of the roller also acting to press the plate downwardly.

We claim as our invention:

1. In combination a table, a feeder for printing plates to move the same along the table, an impression member having movement toward and from the table, an endless feed member for magazines having projections for delivering the magazines on the table beneath the impression means and over the plate feeder, and in a direction at right angles to the direction of movement of the plate feeder, and a second endless feed member having projections following at an interval those on the first feeder and acting upon the magazine after it has remained at rest on the table for receiving its impression, substantially as described.

2. In combination a table to receive the magazines, an impression member movable toward and from the table, an endless feeder having upwardly extending projections to deliver the magazines directly onto the table beneath the impression means, which impression means is located at the end of said endless feeder and a second endless feeder arranged over the table and having downwardly extending projections to engage the magazines while beneath the impression means and move them from under the impression means, the projections of the second feeder acting at an interval after the action of the projections of the first feeder thereon, substantially as described.

3. In combination in apparatus of the class described, an impression member, a plate feeder, and a magazine for supplying the plates to the plate feeder, said magazine being composed of a stationary and a shiftable portion, the stationary portion receiving plates from the shiftable portion, and guide means extending to said stationary portion from a filling point convenient to the operator for guiding the shiftable portion in its movement from said filling point to a position in registration with the stationary portion, substantially as described.

4. In combination in a machine of the class described, an impression member, an address plate feeder, a magazine or chute for supplying plates to the feeder, said magazine or chute being formed of two portions, the lower one of which is stationary and the upper one is shiftable into and out of register with the stationary portion, and a guide extending from the stationary portion of the chute at one side of the machine to a filling point at or near the other side of the machine, to direct the shiftable portion substantially as described.

5. In combination in a machine of the class described, an impression member, an address plate feeder receiving the plates at one end thereof and delivering them at its opposite end, a magazine consisting of a stationary portion at the receiving end of the feeder and a shiftable portion to register therewith and a guide for the shiftable portion extending from a point adjacent the delivery end of the feeder to the stationary portion of the magazine whereby an attendant near the said delivery end may fill the shiftable portion of the magazine and guide the same into registration with the stationary portion of the magazine at the receiving end of the feeder, substantially as described.

6. In combination in a machine of the class described, an impression member, feeder means for magazines operating longitudinally of the machine, feeder means for address plates operating at right angles to the magazine feeder and transversely of the machine to receive the plates at one end and deliver them at the other, a chute at one side of the machine for the address plates, said chute consisting of a stationary and a shiftable portion, and a guide for the said shiftable portion extending transversely of the machine from the stationary chute section to the side of the machine at which the address plates are delivered, substantially as described.

7. In combination impression means, an address plate feeder, a chute or magazine for supplying the plates thereto comprising a main fixed portion and a shiftable portion, the said shiftable portion being adapted to register with the stationary portion, and a follower movable longitudinally of the main chute portion and in line with the runway thereof to permit the fresh supply of plates to move from the shiftable portion of the chute into the main fixed portion, said follower being movable to one side of the chute, said follower being normally located in the horizontal plane intermediate the meeting ends of the chute portions substantially as described.

8. In combination impression means, an address plate feeder, a chute or magazine for supplying the plates thereto comprising a main fixed portion and a shiftable portion, the said shiftable portion being adapted to register with the fixed portion, and a follower movable longitudinally of the main part of the chute and in line with the runway thereof to permit the fresh supply of plates to move from the shiftable portion of the chute into the main fixed portion, said follower being movable to one side of the chute, and movably mounted on the shiftable portion of the chute, substantially as described.

9. In combination a plate feeder, a chute or magazine to supply plates thereto composed of a stationary section and a shiftable section adapted to register with the stationary section and each having a through way for the passage of the plates, a follower pivotally mounted on the shiftable section to move therewith and support the plates therein, said follower being also movable longitudinally of the chute and toward and away therefrom, substantially as described.

10. In combination a plate feeder, a chute or magazine to supply plates thereto composed of a stationary section and a shiftable section adapted to register with the stationary section, a follower pivotally mounted on the shiftable section to move therewith and support the plates therein, said follower being also movable longitudinally of the chute and toward and away therefrom, the said follower having an elongated journal bearing in the frame of the shiftable chute section, and a spring for returning the follower to normal position, substantially as described.

11. In combination a plate feeder, a chute comprising a fixed and a shifting section, means for guiding the shifting section from the point where it is filled to the stationary section to register therewith, a follower carried by the shifting section and movable longitudinally of the fixed section, and means for returning the follower to its position on the shifting section, substantially as described.

12. In combination an address plate feeder, a chute for the plates consisting of a fixed and a shifting section, a guide for directing the shifting section from the point at which it is filled to register with the fixed section, and a follower carried by the shifting section, said follower being movable in a direction longitudinally of the fixed section and also laterally in respect thereto, substantially as described.

13. In combination in apparatus of the class described, a stacker chute to receive address plates, feeding means for moving the address plates along the said chute, and means for throwing the feeding means into and out of operation, said means being controlled from the height of the stack of plates in the stacker chute, substantially as described.

14. In combination in apparatus of the class described, a stacker chute to receive address plates, means for feeding the plates through said chute, a feeler or detector device to engage the plates within the chute, and controlling connections between said feeler and the feed mechanism to place the same in or out of operation according to the height of the stack of plates in the stacker chute, substantially as described.

15. In combination with a stacker chute, a feed wheel for moving the plates, a rocker arm with connections for operating the feed wheel, a two-part link, means for reciprocating one part, said two-part link having its members adapted to engage and disengage each other, and controlling connections connected to one of the link members to cause engagement or disengagement thereof with the other link member, and a detector or feeler for controlling the said connections, substantially as described.

16. In combination in apparatus of the class described, a stacker chute to receive the address plates, feed mechanism for said address plates to move the same along the stacker chute, a feeler or detector to engage the plates in the stacker chute, a constantly operating member having a yielding connection with the detector or feeler to operate the same, said constantly operating member moving in relation to the feeler or detector when the latter contacts with a plate in the chute, and connections between the constantly operating member and the feed mechanism for controlling the same and placing it in or out of operation, substantially as described.

17. In combination with feed mechanism for the address plates, a controller comprising a detector or feeler member pivotally mounted, a constantly operating member pivoted to the feeler member, a spring for holding said constantly operating member and feeler member in relation to move in unison, and a connection between the constantly operating member and the feed mechanism, said connection being located axially in line with the pivot of the feeler or detector member whereby, when the feeler member is free to turn, no movement will be imparted through the said connection, but when the feeler member is arrested, the constantly operating member will turn on the pivot thereof to operate the said connection and control the feed mechanism, substantially as described.

18. In combination with a table having a guide groove for the depressed margins of address plates, a chain feeder engaging the depressed margins of the plates in the guide groove, means for operating the feed chain consisting of an oscillating jointed arm connected with the feeder and a spring, said jointed arm acting as detector means for stopping the machine when a plate becomes jammed in its guide groove, substantially as described.

19. In combination with a guideway for address plates having depressed side margins which enter said guide way, a retainer plate extending part way over said guideway, springs for holding said retainer plate in position to allow the same to yield if a bent plate is fed along the guideway, and feeder means engaging the depressed margins of the plates, substantially as described.

20. In combination, impression means, a rock shaft having connection to said impression means, a chain feeder for address plates connections between the said chain feeder and the rock shaft to be operated thereby, a stacker chute, feed mechanism for moving the plates along the stacker chute, a connection between the feed mechanism and the said rock shaft, a detector or feeler to engage the plates in the stack chute, and a connection from the said rock shaft to the detector or feeler, substantially as described.

21. In combination in apparatus of the class described, impression means, feeder means for the magazines, and a hook in the path of the magazine pivotally mounted above the path of the magazine and depending from its pivot to be lifted by pressure from the front edge of the magazine, said hook, as it rises, maintaining its hold upon the magazine to lift its front edge while its rear edge moves onward, thus reversing the magazine.

22. In combination a feeder for address plates, a stacker chute extending from the delivery end of said feeder downwardly, a feeder for moving the address plates through the stacker chute and detector means at the top of said chute with connections operated thereby for controlling the stacker chute feeder, substantially as described.

23. In combination with a bed having a guide way for address plates, a roller having a beveled edge tapering downwardly and extending into the guideway to engage the address plates, said roller being spring-pressed and serving as a yielding stop for the address plates, and as means for forcing them laterally and downwardly, substantially as described.

In testimony whereof, we affix our signatures in presence of two witnesses.

CHARLES OWENS.
ULYSSES G. LEE.
ALEXANDER LYLE.

Witnesses for Owens and Lee:
  GOLDIE L. ECKSTEIN,
  MOLLY D. AVIDON.
Witnesses for Lyle:
  CLAYTON J. WOODWORTH,
  E. D. KINCAID.